(12) United States Patent
Miura et al.

(10) Patent No.: US 9,457,595 B2
(45) Date of Patent: Oct. 4, 2016

(54) IMAGE PROCESSING APPARATUS

(71) Applicant: Brother Kogyo Kabushiki Kaisha, Nagoya (JP)

(72) Inventors: Katsuro Miura, Toyota (JP); Kenji Samoto, Nagoya (JP)

(73) Assignee: Brother Kogyo Kabushiki Kaisha, Nagoya-Shi (JP)

( * ) Notice: Subject to any disclaimer, the term of this patent is extended or adjusted under 35 U.S.C. 154(b) by 0 days.

(21) Appl. No.: 15/019,071

(22) Filed: Feb. 9, 2016

(65) Prior Publication Data
US 2016/0250865 A1   Sep. 1, 2016

(30) Foreign Application Priority Data

Feb. 27, 2015 (JP) ................................. 2015-038851

(51) Int. Cl.
*B41J 11/00* (2006.01)
*H04N 1/00* (2006.01)

(52) U.S. Cl.
CPC ......... *B41J 11/007* (2013.01); *H04N 1/00522* (2013.01); *H04N 1/00554* (2013.01); *H04N 1/00559* (2013.01); *H04N 2201/0094* (2013.01)

(58) Field of Classification Search
CPC ... B41J 11/007; B41J 2/442; H04N 1/00559; H04N 1/00522; H04N 1/00554; H04N 2201/0094
See application file for complete search history.

(56) References Cited

U.S. PATENT DOCUMENTS

| 6,991,331 | B2* | 1/2006 | Kagami | B41J 29/13 347/104 |
| 7,658,490 | B2* | 2/2010 | Hwang | H04N 1/00525 347/101 |
| 7,815,304 | B2* | 10/2010 | Ahn | B41J 13/103 347/108 |
| 2006/0221168 | A1* | 10/2006 | Wakiyama | B41J 13/106 347/108 |
| 2012/0001993 | A1 | 1/2012 | Miura | |

FOREIGN PATENT DOCUMENTS

| JP | 2012-001329 A | 1/2012 |
| JP | 2012-013932 A | 1/2012 |
| JP | 2015-003801 A | 1/2015 |

* cited by examiner

Primary Examiner — Kristal Feggins
(74) Attorney, Agent, or Firm — Burr & Brown, PLLC

(57) ABSTRACT

An image processing apparatus, including: a first unit; a second unit; and a pair of first hinges spaced apart from each other in a first direction, the first and second units being coupled through the hinges, wherein the first unit includes a supporter for supporting a recording medium and a first conveyor including a supply roller and configured such that, in a state in which recording media are set on the supporter, the first conveyor conveys the media one by one by the supply roller toward a downstream side in a conveyance direction, wherein the supporter is configured to be pivotally movable between a housed position and a use position about an axis extending, on a specific side of the first unit, in a direction parallel to the first direction, and wherein the supporter is disposed between the first hinges at least when located at the housed position.

12 Claims, 9 Drawing Sheets

IMAGE PROCESSING APPARATUS

CROSS REFERENCE TO RELATED APPLICATION

The present application claims priority from Japanese Patent Application No. 2015-038851, which was filed on Feb. 27, 2015, the disclosure of which is herein incorporated by reference in its entirety.

BACKGROUND

1. Technical Field

The following disclosure relates to an image processing apparatus.

2. Description of the Related Art

There is known an image processing apparatus having an image forming device for forming an image on a recording medium and configured to supply the recording medium from a specific side (e.g., a rear side) of the apparatus. For instance, the known apparatus includes a supporter provided on the side of the apparatus for supporting the recording medium. A plurality of recording media can be set on the supporter. The recording media set on the supporter are supplied one by one by a supply roller provided on the side of the apparatus to the image forming device.

The known apparatus includes an image reading device at its upper portion, and the image forming device is disposed below the image reading device. In an instance where the image reading device is a flatbed image scanner, the image reading device is provided with a platen for supporting an original thereon and a cover configured to be pivotally movable between a closed position at which the cover covers the platen and an open position at which the cover is spaced apart from the platen. The thus configured cover sometimes incorporates an automatic document feeder (ADF).

SUMMARY

The apparatus in which the cover is provided at its upper side and the supporter for supporting the recording medium (hereinafter simply referred to as "supporter" where appropriate) is provided on a rear side of the apparatus suffers from the following disadvantages. When comparison is made between two apparatuses respectively having covers with mutually the same depth dimension, the apparatus having the supporter on its rear side has a depth dimension of the apparatus as a whole larger than that of the apparatus not having the supporter. In this case, the apparatus is large-sized in the depth direction, making it difficult to place the apparatus in a relatively narrow space.

When comparison is made between two apparatuses having mutually the same depth dimension of the apparatus as a whole, the depth dimension of the cover is smaller in the apparatus having the supporter on its rear side than in the apparatus not having the supporter. In this case, when a user pivots the cover to the open position and places an original on the platen, the cover having a smaller depth dimension needs to be pivoted at a larger pivot angle in an instance where the cover is moved away from the platen by the same distance, resulting in lowered operability.

By reducing the depth dimension of the supporter, the depth dimension of the apparatus as a whole can be accordingly reduced without changing the depth dimension of the cover. It is thus possible to downsize the apparatus while preventing deterioration in the operability of the cover. By reducing the depth dimension of the supporter, the depth dimension of the cover can be accordingly increased without changing the depth dimension of the apparatus as a whole. It is thus possible to improve the operability of the cover while preventing upsizing of the apparatus. The reduction in the depth dimension of the supporter, however, results in a reduction in the amount of the recording media that can be set on the supporter. This leads to another disadvantage that it is troublesome for a user to feed the recording media to the supporter when printing is successively performed on a large number of recording media.

An aspect of the disclosure relates to an image processing apparatus in which a plurality of recording media can be set on a supporter provided on a specific side of the apparatus and which can achieve, at the same time, downsizing of the apparatus and improvement of the operability when an upper portion of the apparatus is opened and closed.

In one aspect of the disclosure, an image processing apparatus includes: a first unit; a second unit; and a pair of first hinges through which the first unit and the second unit are coupled, wherein the first hinges are spaced apart from each other in a first direction which is one of two directions that are orthogonal to an up-down direction and orthogonal to each other, wherein the second unit is configured to be pivotally movable through the first hinges between a closed position and an open position about an axis extending, on a specific side of the second unit, in a direction parallel to the first direction, such that the second unit covers an upper surface of the first unit when located at the closed position and the second unit is spaced apart from the upper surface of the first unit when located at the open position, wherein the first unit includes: a supporter for supporting a recording medium; a first conveyor configured to convey the recording medium from the supporter toward a downstream side in a conveyance direction along a first conveyance path, the first conveyor including (a) an inlet which is provided on a specific side of the first unit and through which the recording medium is introduced into the first conveyance path and (b) a supply roller configured to be rotatable about an axis extending in the direction parallel to the first direction, the first conveyor being configured such that, in a state in which a plurality of recording media are set on the supporter, the first conveyor conveys the recording media one by one by the supply roller toward the downstream side in the conveyance direction; and an image forming device configured to form an image on the recording medium conveyed by the first conveyor, wherein the supporter is configured to be pivotally movable between a housed position and a use position about an axis extending, on the specific side of the first unit, in the direction parallel to the first direction, such that the supporter closes the inlet when located at the housed position and the supporter opens the inlet when located at the use position so as to support the recording medium, and wherein the supporter is disposed between the first hinges at least when located at the housed position.

BRIEF DESCRIPTION OF THE DRAWINGS

The objects, features, advantages, and technical and industrial significance of the present disclosure will be better understood by reading the following detailed description of one embodiment, when considered in connection with the accompanying drawings, in which.

DETAILED DESCRIPTION OF THE EMBODIMENT

There will be hereinafter described an image processing apparatus according to one embodiment.

Structure of Image Processing Apparatus

Structure of MFP

Figure 1:
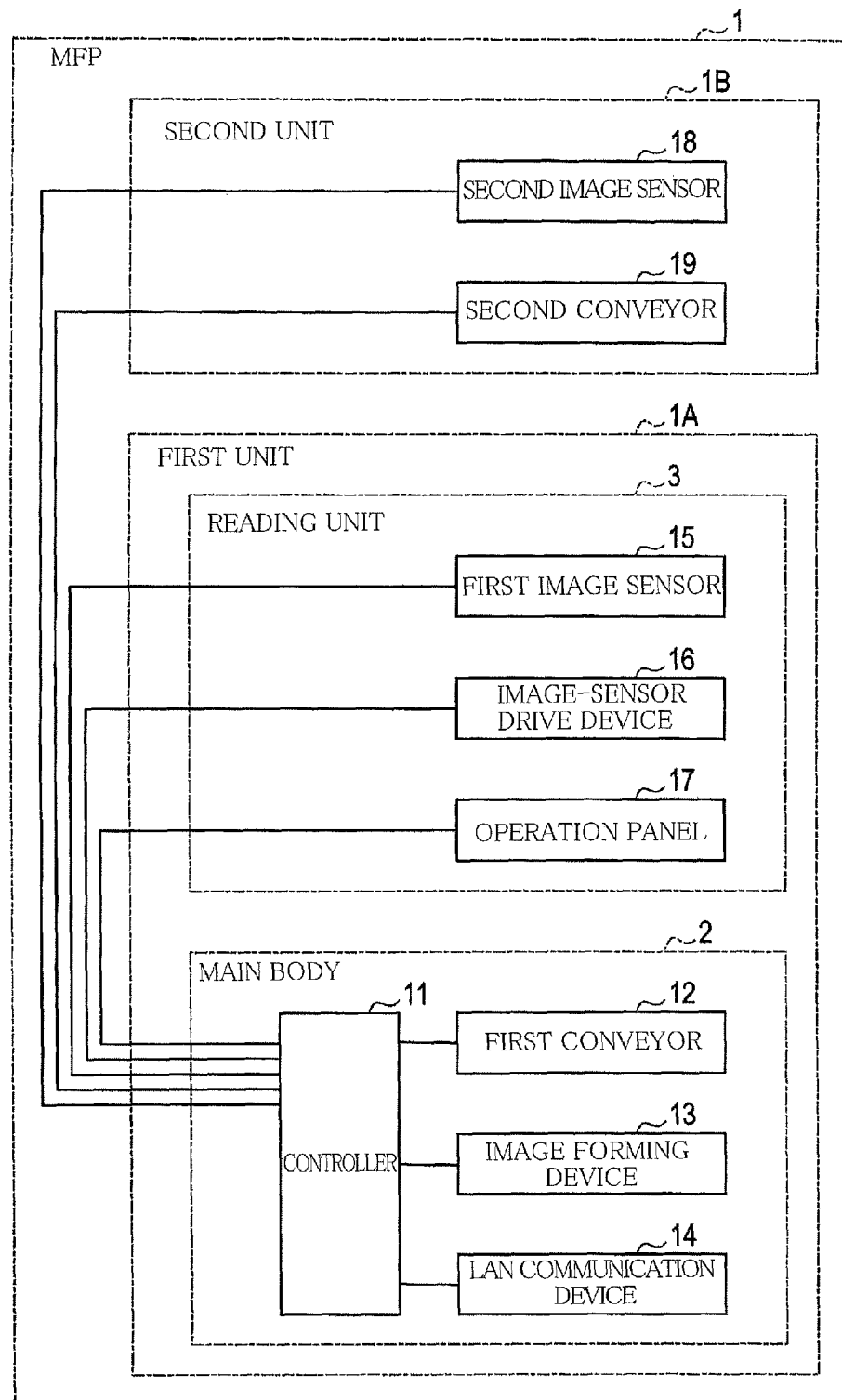
FIG. 1 is a block diagram showing a structure of a multifunction peripheral (MFP) according to one embodiment.

A multifunction peripheral (MFP) 1 shown in FIG. 1 has a structure corresponding to one example of the image processing apparatus described above. As shown in FIG. 1, the MFP 1 includes a first unit 1A and a second unit 1B. The first unit 1A includes a main body 2 and a reading unit 3. In the main body 2, a controller 11, a first conveyor 12, an image forming device 13, and a LAN communication device 14 are disposed. In the reading unit 3, a first image sensor 15, an image-sensor drive device 16, and an operation panel 17 are disposed. The first image sensor 15 and the image-sensor drive device 16 are one example of "image reader". In the second unit 1B, a second image sensor 18 and a second conveyor 19 are disposed.

The controller 11 includes a CPU, a ROM, and a RAM which are known in the art. The CPU executes predetermined processes according to control programs stored in the ROM and the RAM, for controlling components and devices of the MFP 1.

The first conveyor 12 is configured to convey the recording medium toward a downstream side in a conveyance direction along a first conveyance path. Specifically, the first conveyor 12 includes a motor, a plurality of rollers defining the first conveyance path, a power transmitting mechanism for transmitting power to some of the plurality of rollers, and guides cooperating with the plurality of rollers to define the first conveyance path. The motor is operated under control of the controller 11. A part of the plurality of rollers is drivingly rotated by power transmitted from the motor. The rest of the plurality of rollers is disposed such that each roller cooperates with a corresponding one of the drivingly rotated rollers to nip the recording medium therebetween and are rotated following the drivingly rotated rollers or the recording medium being conveyed. Each of the guides is disposed between adjacent two of the drivingly rotated rollers, so as to guide a sheet as the recording medium conveyed by the rollers.

The image forming device 13 is capable of forming, by an ink-jet method, an image on the recording medium conveyed by the first conveyor 12. Specifically, the image forming device 13 includes a recording head for ejecting ink and a drive mechanism for reciprocating the recording head. The image forming device 13 may be configured to form an image on the recording medium by an electrophotographic method. The LAN communication device 14 includes a communication interface device for wireless LAN and a communication interface device for wired LAN.

The first image sensor 15 includes a plurality of reading elements arranged in one direction. In the present embodiment, the first image sensor 15 is a contact image sensor (CIS). The image-sensor drive device 16 is configured to move the first image sensor 15 in a sub scanning direction orthogonal to a main scanning direction which coincides with the one direction in which the reading elements of the first image sensor 15 are arranged.

Figure 2:
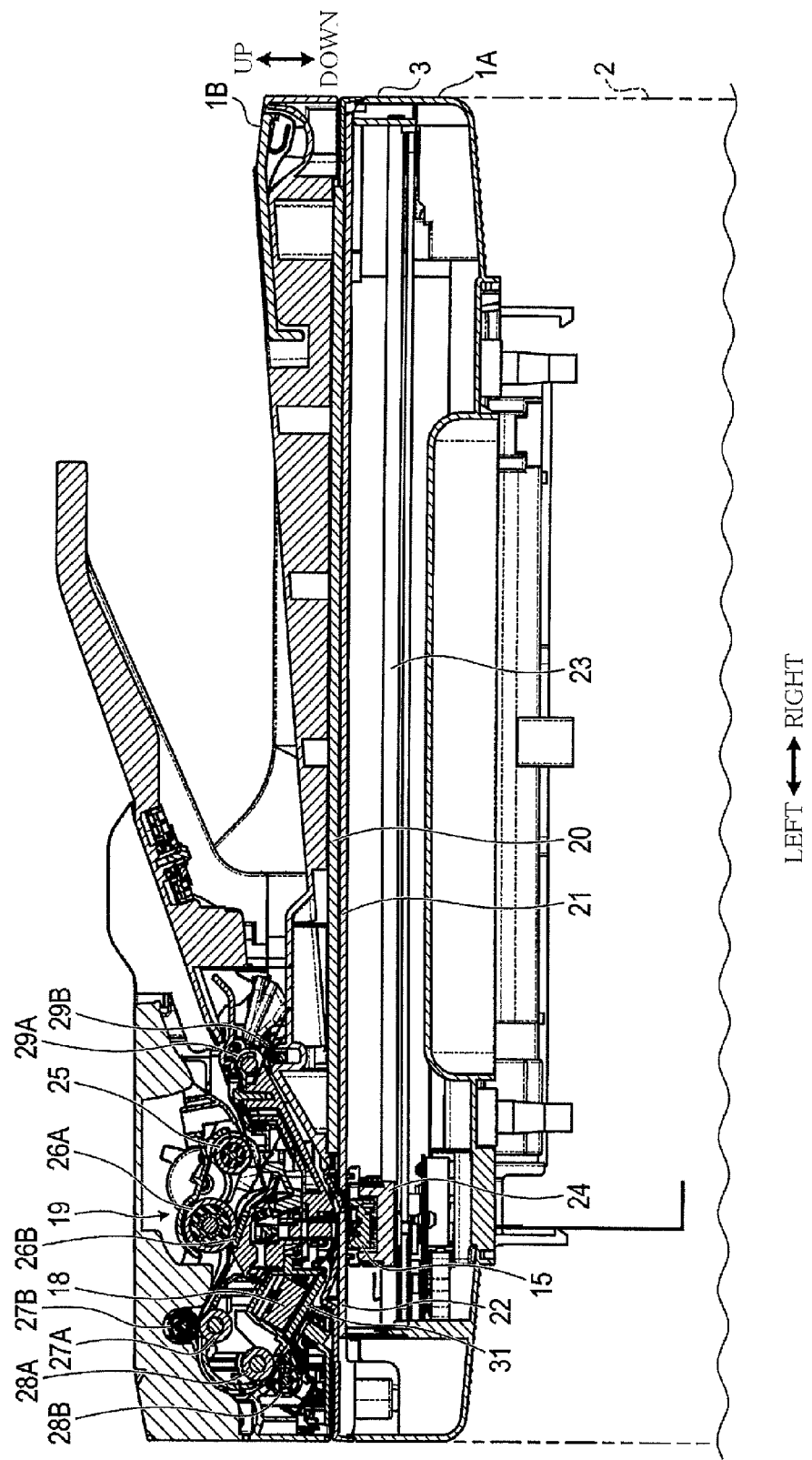
FIG. 2 is a vertical cross-sectional view of a reading unit and a second unit.

As shown in FIG. 2, a first platen 21 and a second platen 22, each of which is a transparent plate, are disposed on an upper surface of the first unit 1A, namely, on an upper surface of the reading unit 3. A guide rail 23 is disposed below the first platen 21 and the second platen 22, so as to extend substantially in parallel with lower surfaces of the first platen 21 and the second platen 22. A carriage 24 is mounted on the guide rail 23 so as to be reciprocable along the guide rail 23, and the first image sensor 15 is mounted on the carriage 24. The image-sensor drive device 16 includes a motor, the carriage 24, and a power transmitting mechanism for transmitting power from the motor to the carriage 24.

The first image sensor 15 is movable along a lower surface of the first platen 21. The first image sensor 15 is configured to read an image on an object to be read placed on an upper surface of the first platen 21 while moving along the first platen 21. A presser 20 is provided on a lower surface of the second unit 1B for pressing the object to be read onto the first platen 21.

The operation panel 17 includes: input devices, such as a touch panel, buttons, and switches, operated by a user for inputting instructions to the MFP 1; and output devices, such as a liquid crystal display and lamps, for notifying the user of an operating state of the MFP 1.

The second image sensor 18 includes a plurality of reading elements arranged in one direction. In the present embodiment, the second image sensor 18 is a contact image sensor (CIS). The second conveyor 19 is a conveyor in which an automatic document feeder (ADF) is incorporated. The second conveyor 19 is configured to convey a sheet as an object for which image reading is to be performed, toward the downstream side in the conveyance direction along a second conveyance path. As shown in FIG. 2, the second conveyor 19 includes a supply roller 25, a separating roller 26A, a separating piece 26B, a first conveying roller 27A, a first pinch roller 27B, a second conveying roller 28A, a second pinch roller 28B, an output roller 29, and an output pinch roller 29B.

The first image sensor 15 is movable to a position at which the first image sensor 15 is opposed to the second platen 22. The first image sensor 15 is configured to stay stationary at that position and to read an image on a first surface of a sheet conveyed by the second conveyor 19 while passing in contact with the second platen 22. The second image sensor 18 is disposed at a position at which the second image sensor 18 is opposed to a third platen 31. The second image sensor 18 is configured to read an image on a second surface of the sheet conveyed by the second conveyor 19 while passing in contact with the third platen 31.

Figure 3:
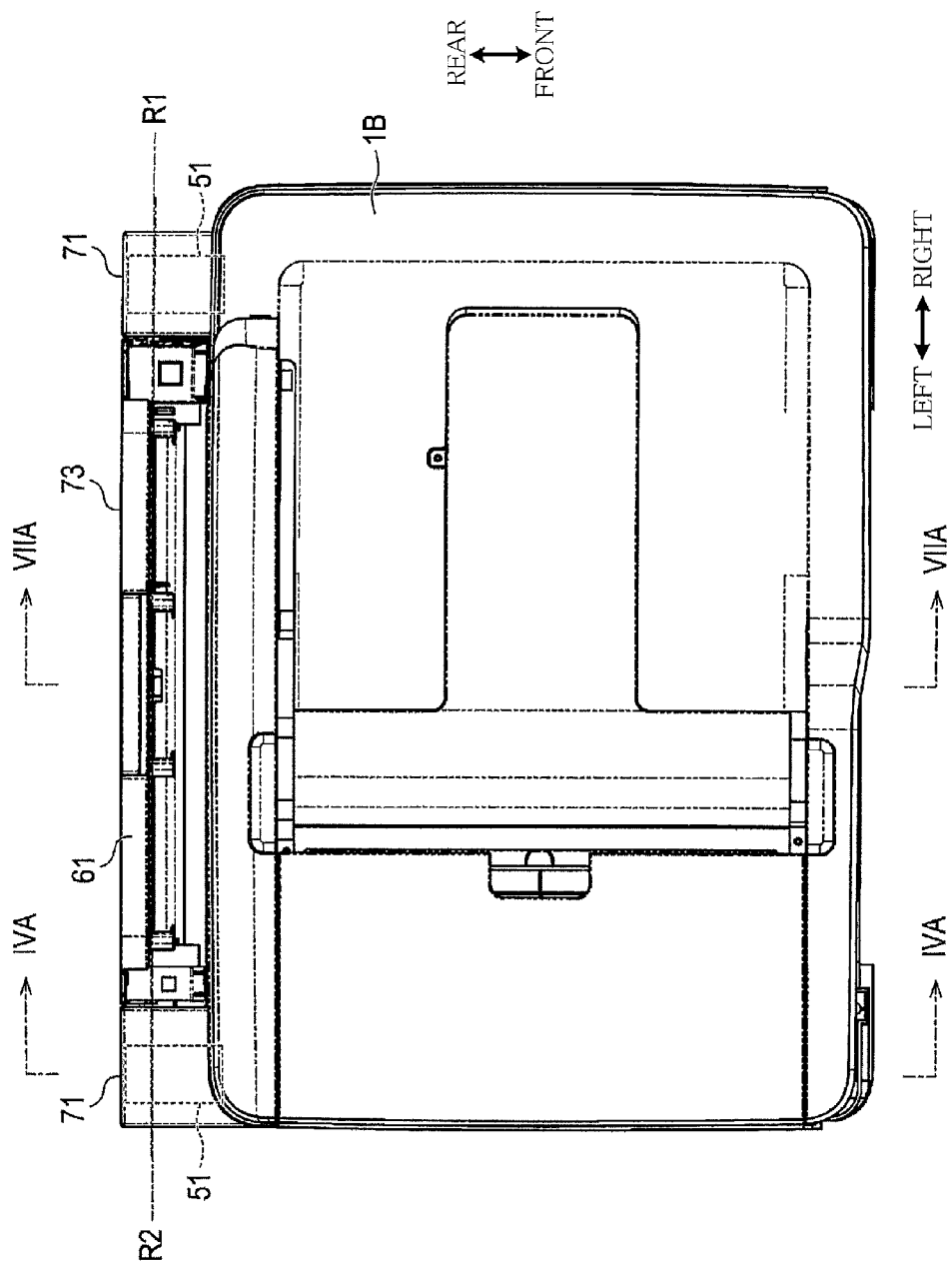
FIG. 3 is a plan view of a first unit and the second unit.

Details of Opening and Closing Mechanism of Second Unit, Opening and Closing Mechanism of Reading Unit, and Supporter As shown in FIG. 3, the second unit 1B is coupled to the first unit 1A through a pair of first hinges 51, 51 spaced apart from each other in a right-left direction (as one example of "first direction"). Thus, the second unit 1B is configured to be pivotally movable about an axis R1 extending, on a rear side (as one example of "specific side") of the second unit 1B, in a direction parallel to the right-left direction.

Figure 4A:
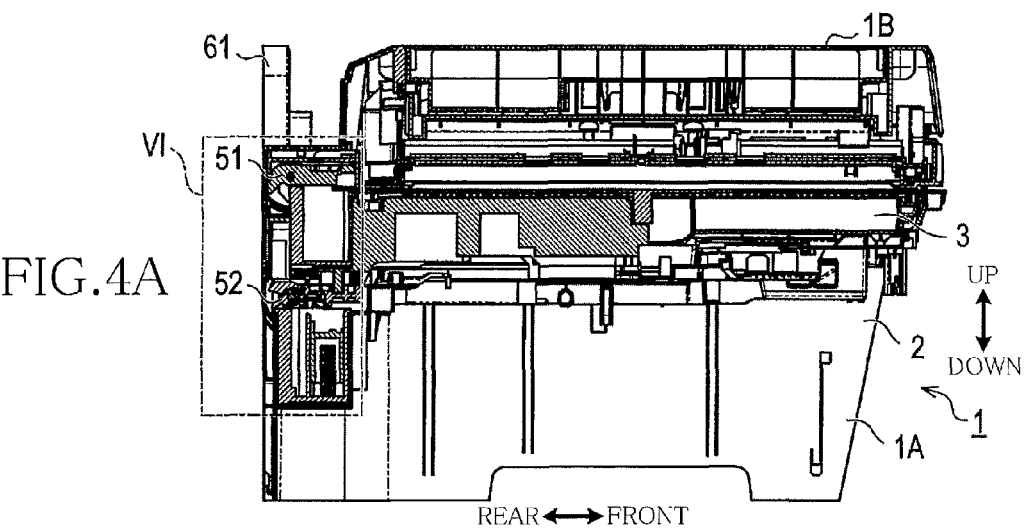
FIG. 4A is a cross-sectional view of the first unit and the second unit at a portion taken along line IVA-IVA in FIG. 3
Figure 4B:
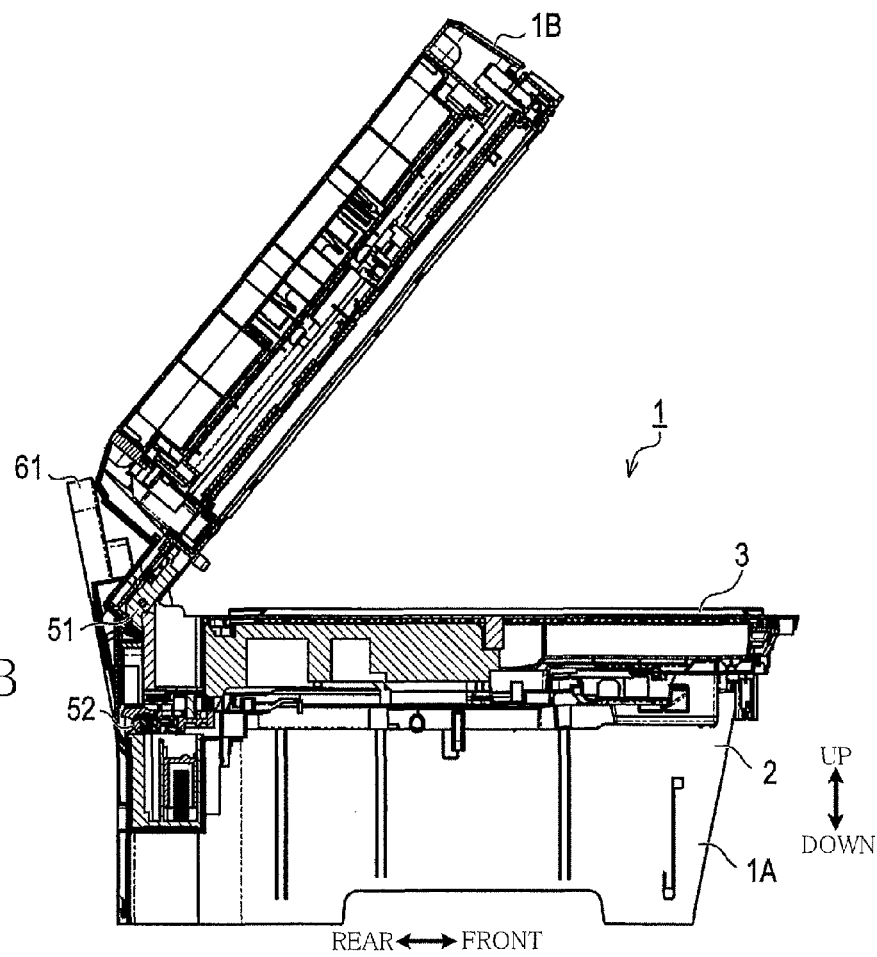
FIG. 4B is a cross-sectional view of the second unit moved to an open position from a closed position shown in FIG. 4A.

When the second unit 1B pivots about the axis R1, the second unit 1B moves between a closed position shown in FIG. 4A and an open position shown in FIG. 4B. In FIGS. 4A and 4B, only one of the two first hinges 51, 51 are illustrated. The other of the two first hinges 51, 51 is substantially identical in shape and function with the one of the two first hinges 51, 51 and its illustration is dispensed with.

When the second unit 1B is located at the closed position, the second unit 1B covers the upper surface of the first unit 1A. The second unit 1B in this state permits the presser 20 provided on its lower surface to press, onto the first platen 21, an object to be read which is placed on the upper surface of the first platen 21. Further, the ADF incorporated in the second unit 1B can be used in this state, and the sheet conveyed by the second conveyor 19 can be brought into contact with the second platen 22.

On the other hand, when the second unit 1B is located at the open position, the second unit 1B is spaced apart from the upper surface of the first unit 1A. In this state, the object to be read can be set on and removed from the upper surface of the first platen 21.

The reading unit 3 is coupled to the main body 2 through a pair of second hinges 52, 52 so as to be pivotally movable about an axis R2 extending, on a rear side (as one example of "specific side") of the reading unit 3, in the direction parallel to the right-left direction.

Figure 5:
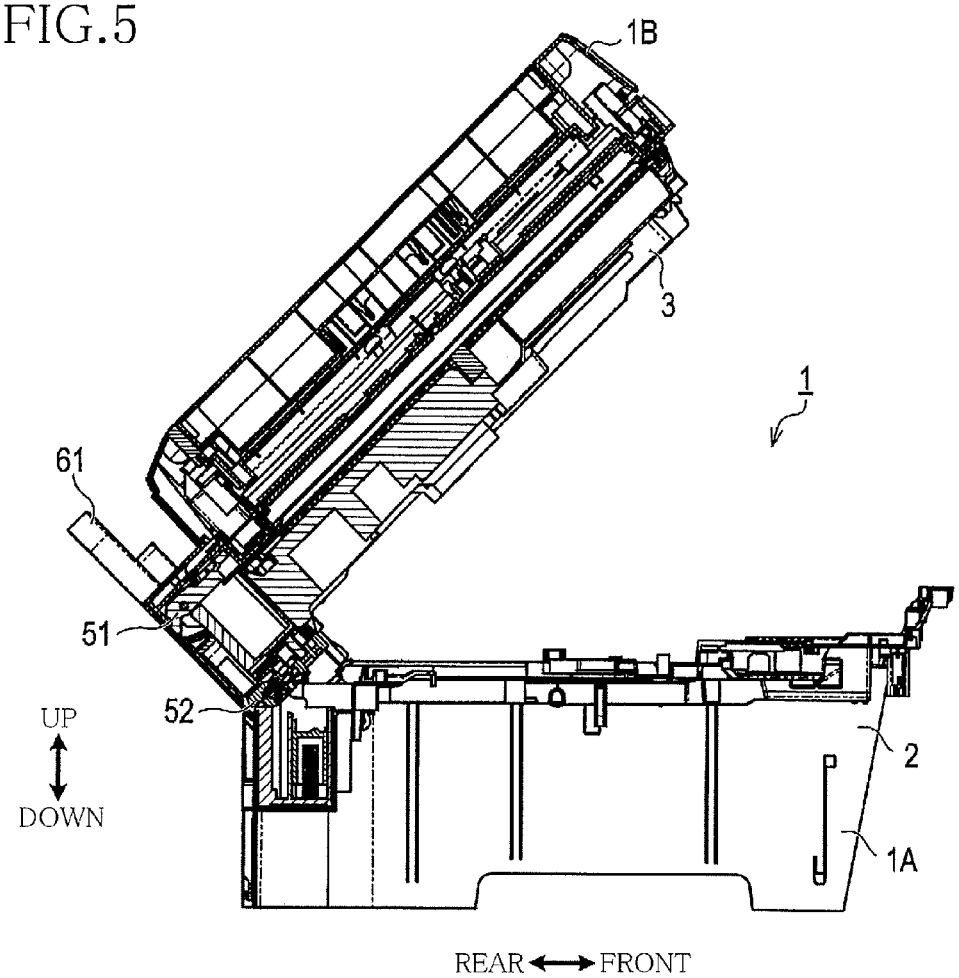
FIG. 5 is a cross-sectional view of the reading unit moved to a second position from a first position shown in FIG. 4A.

When the reading unit 3 pivots about the axis R2, the reading unit 3 moves between a first position shown in FIG. 4A and a second position shown in FIG. 5. When the reading unit 3 is located at the first position, the reading unit 3 is located on the main body 2. On the other hand, when the reading unit 3 is located at the second position, the reading unit 3 is spaced apart from the main body 2.

In this respect, when the reading unit 3 is located at the second position, it is possible to perform, through an upper opening (not shown) of the main body 2, maintenance of components and devices (e.g., the image forming device 13) disposed in the main body 2. For instance, a jam clearing operation can be performed through the opening.

One of the two second hinges 52 is disposed substantially right below a corresponding one of the two first hinges 51. Though only one of the two second hinges 52 is illustrated in FIGS. 4A, 4B, and FIG. 5, the other of the two second hinges 52 is disposed substantially right below the other of the two first hinges 51. Thus, like the pair of first hinges 51, 51, the pair of second hinges 52, 52 are also spaced apart from each other in the right-left direction. The other of the two second hinges 52, 52 is substantially identical in shape and function with the other of the two second hinges 52, 52, and its illustration is dispensed with.

Figure 6:
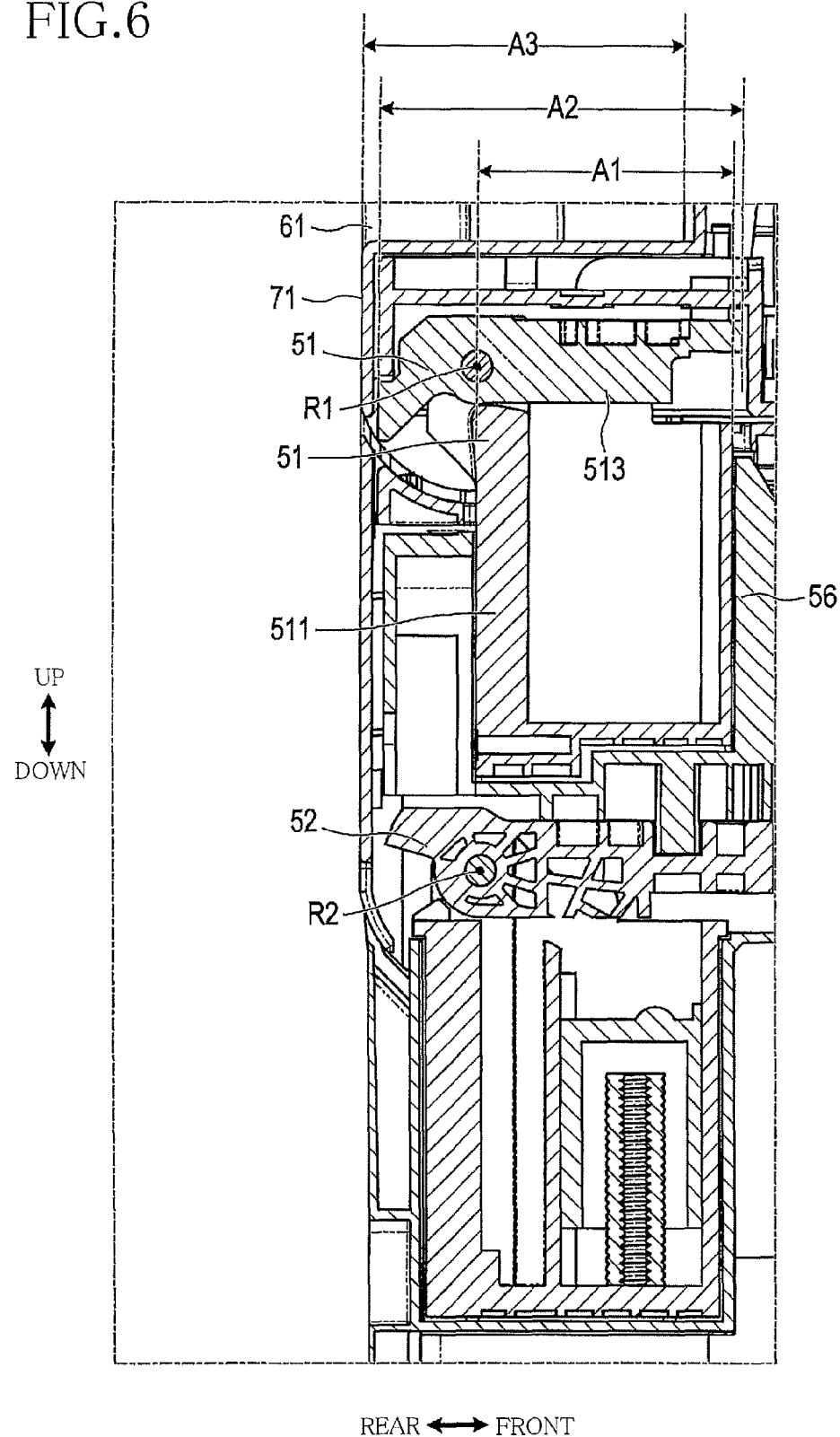
FIG. 6 is an enlarged cross-sectional view of a portion VI in FIG. 4A.

As shown in FIG. 6, each first hinge 51 includes a strut portion 511 and a pivot portion 513. The strut portion 511 is fitted in and held by a strut holder portion 56 formed in the first unit 1A so as to be movable in the up-down direction. The pivot portion 513 is pivotally coupled to the strut portion 511 and attached to the second unit 1B so as to be movable with the second unit 1B. In an instance where an object to be read having a relatively large thickness, such as a book, is placed on the upper surface of the first platen 21, the second unit 1B is moved upward with the first hinges 51, 51 owing to the thus configured strut portion 511, so that the second unit 1B can cover the first platen 21 from above in a state in which the relatively thick object is sandwiched therebetween.

Figure 7A:
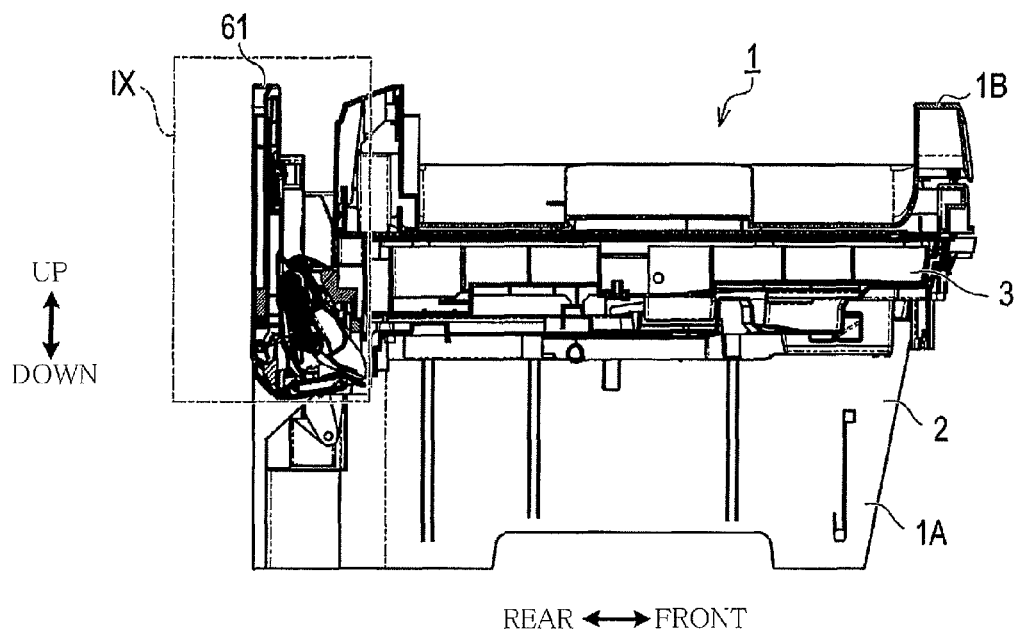
FIG. 7A is a cross-sectional view of the first unit and the second unit at a portion taken along line VIIA-VIIA in FIG. 3
Figure 7B:
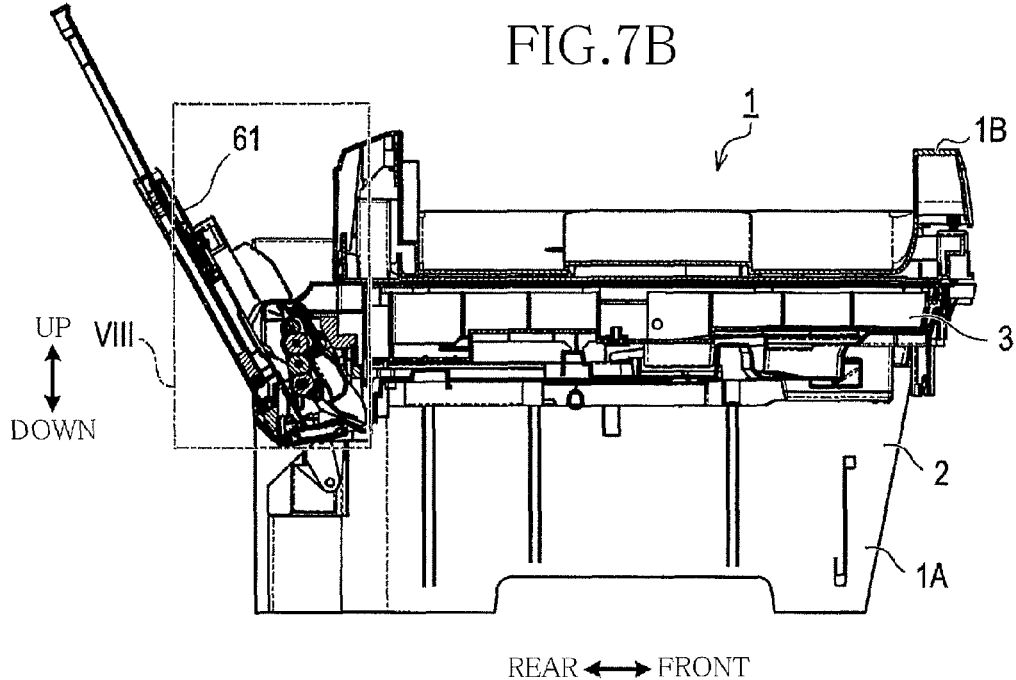
FIG. 7B is a cross-sectional view of a supporter moved to a use position from a housed position shown in FIG. 7A.
Figure 8:
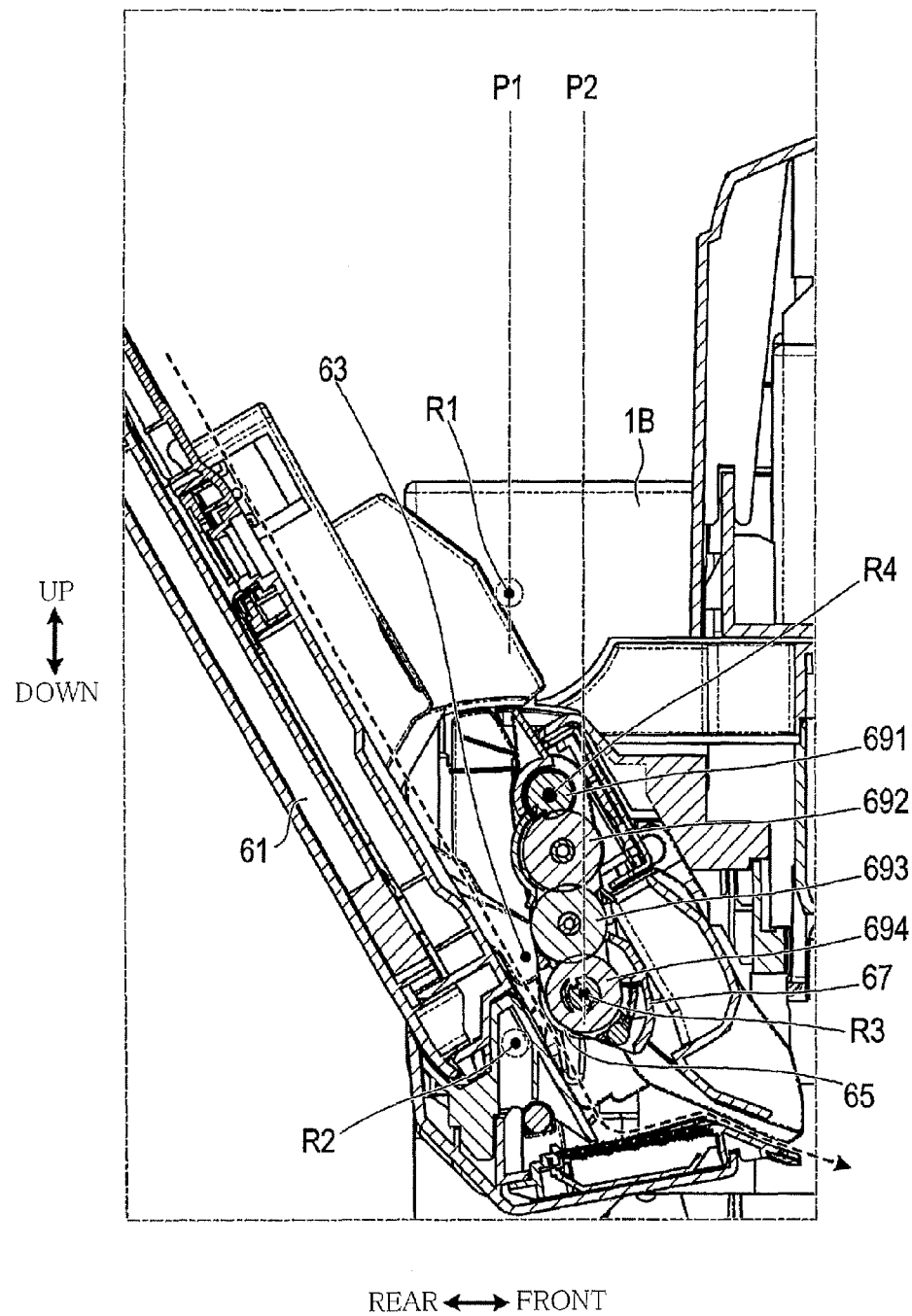
FIG. 8 is an enlarged cross-sectional view of a portion VIII in FIG. 7B.

As shown in FIGS. 7A, 7B, and 8, a supporter 61 for supporting the recording medium is disposed on a rear side (as one example of "specific side") of the first unit 1A. The supporter 61 is configured to be pivotally movable about the axis R2 extending, on the rear side of the first unit 1A, in the direction parallel to the right-left direction. In the present embodiment, the center of the pivotal movement (the pivot center) of the supporter 61 and the center of the pivotal movement (the pivot center) of the reading unit 3 coincide with each other. In other words, the pivot center of the supporter 61 and the pivot center of the reading unit 3 are located on the same axis R2.

When the supporter 61 pivots about the axis R2, the supporter 61 moves between a housed position shown in FIG. 7A and a use position shown in FIG. 7B. When the supporter 61 is located at the use position, a plurality of recording media can be set on the supporter 61. The first conveyor 12 is configured to convey the recording medium from the supporter 61 toward the downstream side in the conveyance direction along the first conveyance path. The first conveyor 12 includes an inlet 63 which is provided on the rear side of the first unit 1A and through which the recording medium is introduced into the first conveyance path.

A supply roller 65 is provided near the inlet 63. The supply roller 65 is held by a holder 67 so as to be rotatable about an axis R3 extending in the direction parallel to the right-left direction. The holder 67 is supported by the supporter 61 so as to be pivotable about an axis R4 extending in the right-left direction. Thus, the supply roller 65 is rotatable about the axis R3 and is pivotable about the axis R4. Drive gears 691, 692, 693, 694 are mounted on the holder 67. The center of rotation of the drive gear 691 coincides with the center of the pivotal movement of the holder 67, i.e., the axis R4, and the center of rotation of the drive gear 694 coincides with the center of rotation of the supply roller 65, i.e., the axis R3.

When the first conveyor 12 is operated and power from a motor (not shown) is transmitted to the drive gear 691, the drive gear 691 is driven and rotated, so that power is transmitted to the drive gear 694 via the drive gears 692, 693. The supply roller 65 is configured to rotate with the drive gear 694. When the supply roller 65 is driven and rotated, the recording medium set on the supporter 61 is conveyed toward the downstream side in the conveyance direction along a path (the first conveyance path) indicated by the broken line in FIG. 8. In an instance where a plurality of recording media are set on the supporter 61, the recording media are conveyed one by one toward the downstream side in the conveyance direction. The image forming device 13 described above is disposed downstream of the path indicated by the broken line in FIG. 8, and an image is formed on the recording medium. The image forming device 13 is known in the art and is not explained here.

Figure 9:
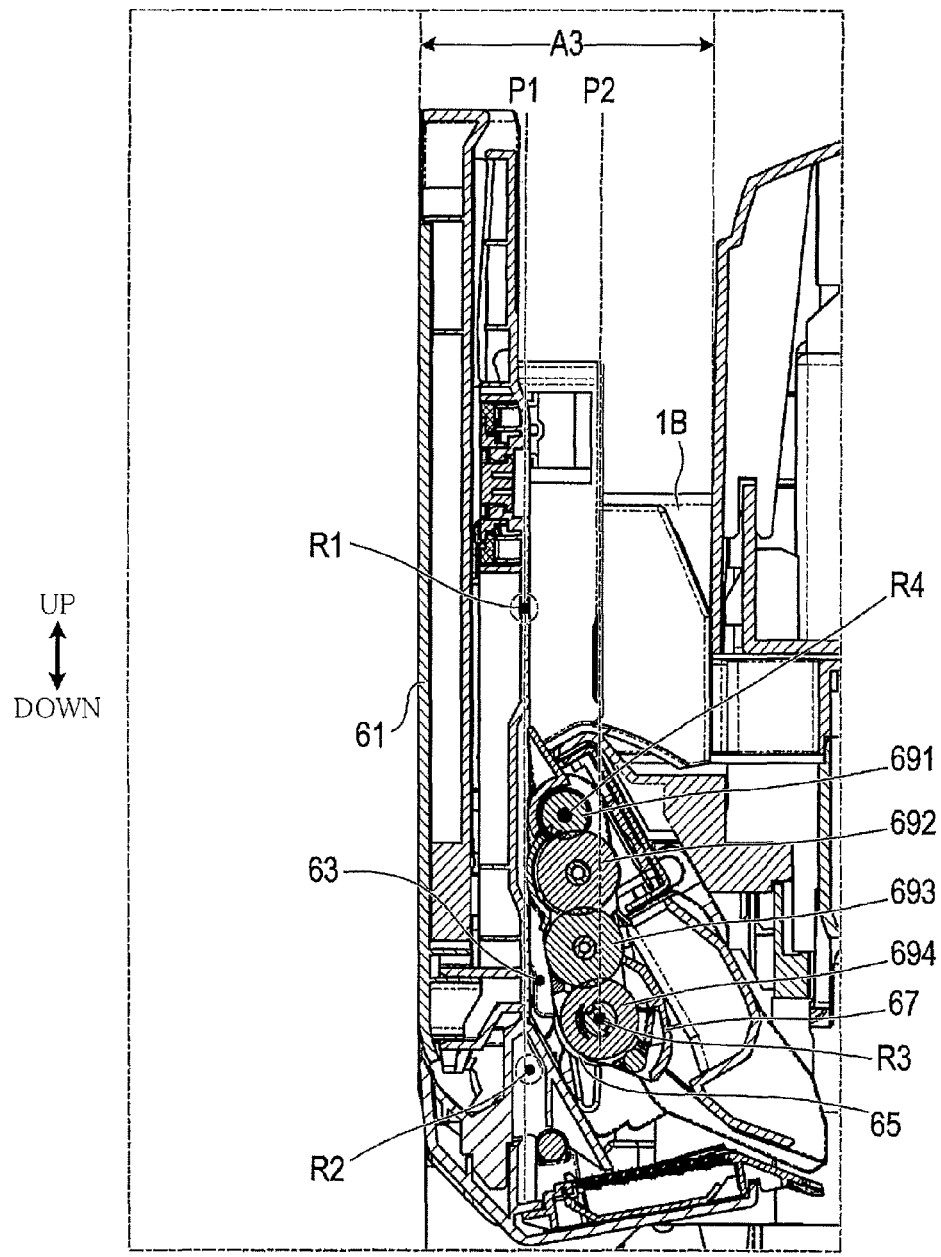
FIG. 9 is an enlarged cross-sectional view of a portion IX in FIG. 7A.

When the supporter 61 is located at the use position, the inlet 63 is open and the user can set the recording medium on the supporter 61 by inserting the recording medium toward the inlet 63. When the supporter 61 is located at the housed position, the inlet 63 is closed by the supporter 61 as shown in FIG. 9. In this case, the recording medium cannot be set on the supporter 61.

When the supporter 61 is located at the housed position, the supporter 61 is disposed between the two first hinges 51, 51 as shown in FIG. 3. In this state, rear ends 71, 71 of the second unit 1B (i.e., exterior portions of the second unit 1B covering the first hinges 51, 51) and a rear end 73 of the supporter 61 are flush with each other.

As described above, the pivot center of the supporter 61 and the pivot center of the reading unit 3 are located on the same axis R2 in the present embodiment. In this configuration, when the reading unit 3 is pivoted to the second position, the supporter 61 can be pivoted with the reading unit 3 as shown in FIG. 5. When the second unit 1B is pivoted from the closed position to the open position in a state in which the supporter 61 is located at the housed position, the second unit 1B comes into contact with the supporter 61. However, the second unit 1B that contacts the supporter 61 causes the supporter 61 to be pivotally moved from the housed position shown in FIG. 4A to a retracted position shown in FIG. 4B. Consequently, even when the second unit 1B contacts the supporter 61, the supporter 61 does not receive an excessively large load from the second unit 1B.

As shown in FIGS. 8 and 9, a position P1 of the pivot center of the second unit 1B defined by the first hinges 51, 51 is shifted with respect to a position P2 of the center of rotation of the supply roller 65 toward the rear side in the front-rear direction (as one example of "second direction"), namely, the position P1 is shifted with respect to the position P2 in a direction away from a central portion of the first unit 1A. In short, the axis R1 of the pivotal movement of the second unit 1B is shifted in the front-rear direction so as to be more distant from the central portion of the first unit 1A than the axis R3 of the rotation of the supply roller 65. The pivotal movement of the holder 67 may cause the position P2 of the center of rotation of the supply roller 65, i.e., the axis R3, to be moved further forward than respective positions shown in FIGS. 8 and 9. Also in this instance, the position P1 is shifted with respect to the position P2 in the direction away from the central portion of the first unit 1A.

As shown in FIGS. 4 and 6, when viewed from the right-left direction, the first hinges 51, 51 overlap the supporter 61 located at the housed position. As described above, the first hinge 51 includes the strut portion 511 and the pivot portion 513. An area A1 that the strut portion 511 occupies and an area A3 that the supporter 61 located at the housed position occupies overlap in the front-rear direction. Further, an area A2 that the pivot portion 513 occupies and the area A3 that the supporter 61 at the housed position occupies overlap in the front-rear direction.

Advantageous Effects

According to the MFP 1 described above, when the supporter 61 is located at the housed position, the supporter 61 is disposed between the pair of the first hinges 51, 51. In this configuration, the first hinges 51, 51 and the supporter 61 overlap each other in the front-rear direction, namely, the first hinges 51, 51 and the supporter 61 overlap each other as viewed from a direction of extension of the axis R1. In other words, the rear surface of the supporter 61 does not protrude rearward with respect to the rear surface of each first hinge 51. Consequently, the dimension of the MFP 1 in the front-rear direction is reduced and the MFP1 is accordingly downsized, as compared with an apparatus in which the first hinges 51, 51 and the supporter 61 do not overlap in the front-rear direction.

When comparison is made between two apparatuses having mutually the same dimension in the front-rear direction of the apparatus as a whole including the supporter 61, the dimension of the second unit 1B in the front-rear direction can be increased in the MFP 1 constructed as described above, as compared with an apparatus in which the first hinges 51, 51 and the supporter 61 do not overlap in the front-rear direction, Thus, when the second unit 1B is pivoted by a predetermined pivot angle, the second unit 1B can be spaced apart from the first unit 1A by a larger distance, resulting in improved operability when the second unit 1B is pivoted.

In the MFP 1 constructed as described above, the position P1 of the pivot center of the second unit 1B defined by the first hinges 51, 51, namely, the axis R1 of the pivotal movement of the second unit 1B, is shifted with respect to the position P2 (the axis R3) of the center of rotation of the supply roller 65 located near the inlet 63 in the direction away from the central portion of the first unit 1A. In other words, the axis R1 of the pivotal movement of the second unit 1B is shifted in the front-rear direction so as to be more distant from the central portion of the first unit 1A than the axis R3 of the rotation of the supply roller 65. In this configuration, the pivot center of the second unit 1B is located on the relatively rear side. When the second unit 1B is opened by the same angle, the second unit 1B can be opened more widely in this configuration, as compared with a configuration in which the pivot center of the second unit 1B is located on the relatively front side.

According to the MFP 1 described above, when the second unit 1B is pivoted from the closed position to the open position and the second unit 1B comes into contact with the supporter 61, the supporter 61 is pivoted from the housed position to the retracted position. The thus pivoted supporter 61 avoids interference with the second unit 1B, so that it is not needed to rely on the shape of the supporter 61 for avoiding interference with the second unit 1B, resulting in a higher degree of freedom in designing the supporter 61.

In the MFP 1 constructed as described above, the pivot center of the reading unit 3 and the pivot center of the supporter 61 are located on the same axis R2. In other words, the axis of the pivotal movement of the reading unit 3 coincides with the axis of the pivotal movement of the supporter 61. Consequently, when the reading unit 3 is pivoted, the reading unit 3 can be pivoted together with the supporter 61 without a risk of giving a load to the supporter 61.

Modifications

While the embodiment has been described above, it is to be understood that the disclosure is not limited to the details of the illustrated embodiment, but may be embodied with various other changes without departing from the spirit and the scope of the disclosure.

In the illustrated embodiment, the first unit 1A is constituted by the main body 2 and the reading unit 3 configured to be pivotable relative to the main body 2. The reading unit may be configured not to be pivotable. Further, the first unit 1A need not be necessarily constituted by the main body 2 and the reading unit 3.

In an instance where the MFP includes the main body 2 and the reading unit 3 configured to be pivotable relative to the main body 2 and further includes the second unit 1B configured to be pivotable relative to the reading unit 3, as in the illustrated embodiment, it is optional whether or not to treat the reading unit 3 as a part of the first unit 1A. In other words, the present disclosure may be applicable to a configuration in which a structure equivalent to the main body 2 corresponds to the first unit and a structure equivalent to the reading unit 3 and a structure equivalent to the second unit 1B correspond to the second unit.

In the illustrated embodiment, the second unit 1B has a function of the ADF. It is optional whether or not the second unit 1B has a function of the ADF. That is, the second unit 1B may have only a function as a cover configured to cover a platen of a flatbed image scanner.

It is optional whether or not the first unit 1A has the structure as the flatbed image scanner. A portion in which the image forming device 13 is housed may be the first unit 1A, and a cover to be opened when maintenance of the image forming device 13 is performed may be the second unit 1B. That is, the present disclosure may be applied to any apparatus other than the MFP 1. For instance, the present disclosure may be applied to a printer only having a printing function.

Supplemental Explanation

It can be understood based on the illustrated embodiment that the image processing apparatus explained above may have the following configurations.

In the image processing apparatus described above, the axis of the pivotal movement of the second unit defined by the first hinges may be shifted in a second direction, which is the other of the two directions, so as to be more distant from a central portion of the first unit than the axis of the rotation of the supply roller.

According to the image processing apparatus described above, the axis of the pivotal movement of the second unit defined by the first hinges is shifted in the second direction so as to be more distant from the central portion of the first unit than the axis of rotation of the supply roller located near the inlet. Consequently, the second unit can be widely opened.

In the image processing apparatus described above, each of the first hinges may include: a strut portion fitted in and held by a strut holder portion of the first unit so as to be movable in the up-down direction; and a pivot portion pivotally coupled to the strut portion and attached to the second unit so as to move with the second unit, and wherein the strut portion may overlap the supporter located at the housed position, in a second direction which is the other of the two directions.

In the image processing apparatus described above, the strut portion of each of the first hinges has a larger dimension in the second direction than in the first direction.

In the image processing apparatus described above, the supporter may be configured to be pivotally movable to a retracted position located between the housed position and the use position, and, when the second unit is pivoted from the closed position to the open position in a state in which the supporter is located at the housed position, the second unit may come into contact with the supporter, so that the supporter is pivoted from the housed position to the retracted position.

According to the image processing apparatus described above, when the second unit is pivoted from the closed position to the open position and the second unit comes into contact with the supporter, the supporter is pivoted from the housed position to the retracted position. The thus pivoted supporter avoids interference with the second unit, so that it is not needed to rely on the shape of the supporter for avoiding interference with the second unit, resulting in a higher degree of freedom in designing the supporter.

In the image processing apparatus described above, the first unit may include: a first platen for supporting, at an upper side of the first unit, an object to be read; and an image reader configured to read an image on the object while moving along the first platen, and the second unit may include a presser which presses the object toward the first platen when the second unit is located at the closed position.

In the image processing apparatus described above, the second unit may include a second conveyor configured to convey a sheet along a second conveyance path, the first unit may include, at the upper side thereof, a second platen with which the sheet conveyed by the second conveyor comes into contact, and the image reader may be configured to be movable to a facing position at which the image reader faces the second platen and to stay at the facing position for reading an image on the sheet conveyed by the second conveyor.

In the image processing apparatus described above, the first unit may include: a main body having the supporter, the first conveyor, and the image forming device; and a reading unit having the first platen and the image reader, the reading unit may be coupled to the main body through a pair of second hinges so as to be pivotally movable between a first position and a second position about an axis extending, on a specific side of the reading unit, in the direction parallel to the first direction, the reading unit may be configured to be located on the main body when located at the first position and to be spaced apart from the main body when located at the second position, and the axis of the pivotal movement of the reading unit may coincide with the axis of the pivotal movement of the supporter.

According to the image processing apparatus constructed as described above, when the reading unit is pivoted, the reading unit and the supporter can be pivoted together without a risk of giving a load to the supporter.

In the image processing apparatus described above, a portion of the second unit at which each of the first hinges is provided may protrude, on the specific side of the second unit, from the other portion of the second unit in the second direction.

In the image processing apparatus described above, the supply roller may be attached to a rear end of a holder configured to be pivotable about an axis extending in the direction parallel to the first direction.

In the image processing apparatus described above, a plurality of drive gears may be mounted on the holder for transmitting a drive power to the supply roller.

In the image processing apparatus described above, the holder may be located so as to be nearer to a central portion of the first unit than the axis of the pivotal movement of the second unit defined by the first hinges.

What is claimed is:

1. An image processing apparatus, comprising:
   a first unit;
   a second unit; and
   a pair of first hinges through which the first unit and the second unit are coupled,
   wherein the first hinges are spaced apart from each other in a first direction which is one of two directions that are orthogonal to an up-down direction and orthogonal to each other,
   wherein the second unit is configured to be pivotally movable through the first hinges between a closed position and an open position about an axis extending, on a specific side of the second unit, in a direction parallel to the first direction, such that the second unit covers an upper surface of the first unit when located at the closed position and the second unit is spaced apart from the upper surface of the first unit when located at the open position, wherein the first unit includes:
a supporter for supporting a recording medium;
a first conveyor configured to convey the recording medium from the supporter toward a downstream side in a conveyance direction along a first conveyance path, the first conveyor including (a) an inlet which is provided on a specific side of the first unit and through which the recording medium is introduced into the first conveyance path and (b) a supply roller configured to be rotatable about an axis extending in the direction parallel to the first direction, the first conveyor being configured such that, in a state in which a plurality of recording media are set on the supporter, the first conveyor conveys the recording media one by one by the supply roller toward the downstream side in the conveyance direction; and
an image forming device configured to form an image on the recording medium conveyed by the first conveyor,
wherein the supporter is configured to be pivotally movable between a housed position and a use position about an axis extending, on the specific side of the first unit, in the direction parallel to the first direction, such that the supporter closes the inlet when located at the housed position and the supporter opens the inlet when located at the use position so as to support the recording medium, and
wherein the supporter is disposed between the first hinges at least when located at the housed position.

2. The image processing apparatus according to claim 1, wherein the axis of the pivotal movement of the second unit defined by the first hinges is shifted in a second direction, which is the other of the two directions, so as to be more distant from a central portion of the first unit than the axis of the rotation of the supply roller.

3. The image processing apparatus according to claim 1, wherein each of the first hinges includes: a strut portion fitted in and held by a strut holder portion of the first unit so as to be movable in the up-down direction; and a pivot portion pivotally coupled to the strut portion and attached to the second unit so as to move with the second unit, and
wherein the strut portion overlaps the supporter located at the housed position, in a second direction which is the other of the two directions.

4. The image processing apparatus according to claim 3, wherein the strut portion of each of the first hinges has a larger dimension in the second direction than in the first direction.

5. The image processing apparatus according to claim 1, wherein the supporter is configured to be pivotally movable to a retracted position located between the housed position and the use position, and
wherein, when the second unit is pivoted from the closed position to the open position in a state in which the supporter is located at the housed position, the second unit comes into contact with the supporter, so that the supporter is pivoted from the housed position to the retracted position.

6. The image processing apparatus according to claim 1, wherein the first unit includes: a first platen for supporting, at an upper side of the first unit, an object to be read; and an image reader configured to read an image on the object while moving along the first platen, and
wherein the second unit includes a presser which presses the object toward the first platen when the second unit is located at the closed position.

7. The image processing apparatus according to claim 6, wherein the second unit includes a second conveyor configured to convey a sheet along a second conveyance path,
wherein the first unit includes, at the upper side thereof, a second platen with which the sheet conveyed by the second conveyor comes into contact, and
wherein the image reader is configured to be movable to a facing position at which the image reader faces the second platen and to stay at the facing position for reading an image on the sheet conveyed by the second conveyor.

8. The image processing apparatus according to claim 6, wherein the first unit includes: a main body having the supporter, the first conveyor, and the image forming device; and a reading unit having the first platen and the image reader,
wherein the reading unit is coupled to the main body through a pair of second hinges so as to be pivotally movable between a first position and a second position about an axis extending, on a specific side of the reading unit, in the direction parallel to the first direction,
wherein the reading unit is configured to be located on the main body when located at the first position and to be spaced apart from the main body when located at the second position, and
wherein the axis of the pivotal movement of the reading unit coincides with the axis of the pivotal movement of the supporter.

9. The image processing apparatus according to claim 1, wherein a portion of the second unit at which each of the first hinges is provided protrudes, on the specific side of the second unit, from the other portion of the second unit in the second direction.

10. The image processing apparatus according to claim 1, wherein the supply roller is attached to a rear end of a holder configured to be pivotable about an axis extending in the direction parallel to the first direction.

11. The image processing apparatus according to claim 10, wherein a plurality of drive gears are mounted on the holder for transmitting a drive power to the supply roller.

12. The image processing apparatus according to claim 10, wherein the holder is located so as to be nearer to a central portion of the first unit than the axis of the pivotal movement of the second unit defined by the first hinges.

* * * * *